United States Patent

[11] 3,604,283

| [72] | Inventor | Hubertus Josephus Van Doorne Stationsstraat 71, Eeurne, Netherlands |
|---|---|---|
| [21] | Appl. No. | 860,235 |
| [22] | Filed | Sept. 23, 1969 |
| [45] | Patented | Sept. 14, 1971 |
| [32] | Priority | Sept. 23, 1968 |
| [33] | | Netherlands |
| [31] | | 6,813,649 |

[54] DRIVING MECHANISM
5 Claims, 7 Drawing Figs.

[52] U.S. Cl. .................................................. 74/231 M,
74/230.17 S, 74/233
[51] Int. Cl. ...................................................... F16g 1/00,
F16g 1/26
[50] Field of Search .......................................... 74/231 M,
233, 230.17 A, 230.17 S

[56] References Cited
UNITED STATES PATENTS

| 2,920,494 | 1/1960 | Dodwell ....................... | 74/231 (M) |
| 3,358,520 | 12/1967 | Heydlauf et al ............... | 74/230.17 (C) |

*Primary Examiner*—Leonard H. Gerin
*Attorney*—Wenderoth, Lind & Ponack

ABSTRACT: A driving mechanism with a driving pulley having a V-shaped circumferential groove and a driven pulley having a V-shaped circumferential groove. A flexible endless member having chamfered flanks interconnects and spans the pulleys. The diameter of the pulleys can be varied automatically and stepless with regard to each other so that different transmission ratios can be obtained. The flexible endless member consists of one or more layers of steel belts arranged with a mutual play that is greater than 0.3 × the thickness of the belt and smaller than 1.8 × the thickness of the belt.

PATENTED SEP 14 1971

HUBERTUS JOSEPHUS VAN DOORNE
INVENTOR

BY *Wenderoth, Lind & Ponack*
ATTORNEYS

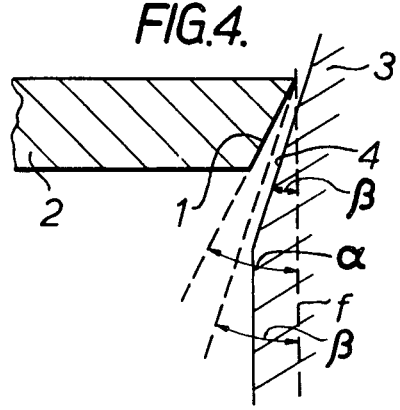
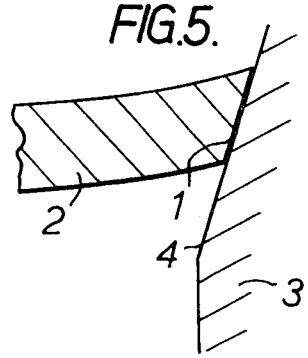
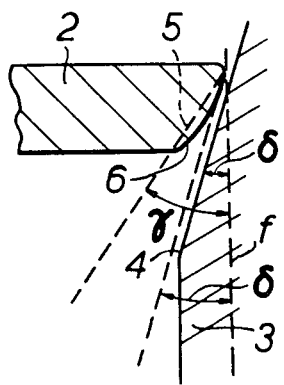
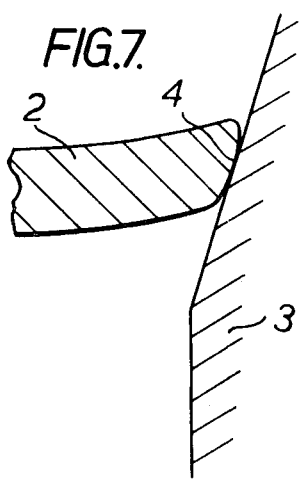

DRIVING MECHANISM

The present invention relates to a driving mechanism, particularly for motor vehicles, comprising a driving pulley with a V-shaped circumferential groove, a driven pulley with a V-shaped circumferential groove and a flexible endless member having chamfered flanks interconnecting and spanning said pulleys, in which the diameter of said pulley automatically and stepless can be varied with regard to each other in such a way that different transmission ratios can be obtained. Such a driving mechanism is known.

Up to now a rubber V-belt has been used as a flexible power transmitting member The couple that can be transmitted by such a V-belt, however, is limited. Such a driving mechanism for transmitting greater amounts of power would comprise pulleys having such large diameters that the mechanism as a unit could not be mounted without a difficulty e.g. in a motor vehicle.

The purpose of the present invention is to provide a driving mechanism that is adapted to transmit a much greater amount of power.

IN THE DRAWINGS

FIG. 4 shows a sectional portion of a steel belt with straight flanks in unbent shape and a sectional portion of a V-shaped pulley to cooperate therewith.

FIG. 5 shows the same belt as shown in FIG. 1 in cooperation with the pulley.

FIG. 6 shows a sectional portion of the steel belt with rounded off chamfered flanks and a sectional portion of a V-shaped pulley to cooperate therewith.

FIG. 7 shows the same belt as in FIG. 3 in cooperation with the pulley.

Figure 1:
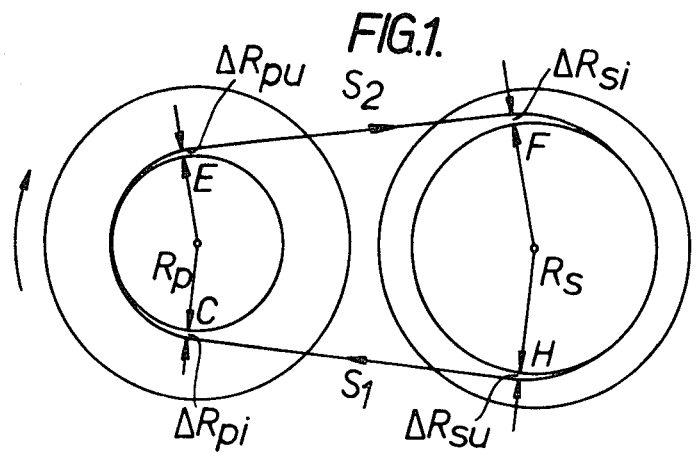
FIG. 1 shows a steel belt running in an automatically operating variable transmission wherein the so-called in and out moving effect is illustrated with the driving mechanism illustrating only one endless steel belt.

For that purpose in the driving mechanism according to the present invention the flexible endless member consists of one or more layers of steel belts. If a steel belt runs (primary an automatically operating variable transmission the so-called in and out moving effect is caused as is illustrated in FIG. 1 showing diagrammatically such a driving mechanism comprising only one endless steel belt. It is to be expected that said belt would move into the pulleys as the points C and F and would leave same at the points H and E. HC and EF form the tangents to the running diameter. The belt, however, has an "elastic behavior" so that same moves into and out of the pulleys with a larger curve ratio than $R_u$ (primary running radius) and $R_s$ (secondary running radius). At the point C the deviation from the nominal $R_\mu$ equals $\Delta R_{pi}$. $\Delta R_{pi}$ is dependent from the stiffness of the steel belt that is from the thickness h of the belt and the running radius $R_\mu$. Furthermore $\Delta R_{pi}$ is dependent from the pulling force $S_1$ in the belt.

When in connection with the amount of power to be transmitted one steel belt is not sufficient. The flexible member according to the invention consists of two or more endless steel belts arranged about each other.

When more than one belt is employed the pulling force $S_1$ therein is not equal. This means, that mutually differing values for $\Delta R_\mu$ occur in the various belts. This is caused by the unavoidable small difference of dimensions which occur when grinding the flanks. Therefore the running-in effect is not equal. Therefore it is necessary that the steel belts should be arranged about each other with a certain amount of play so that each belt can have its own elastic behavior when differences in $S_1$ occur.

Figure 2:
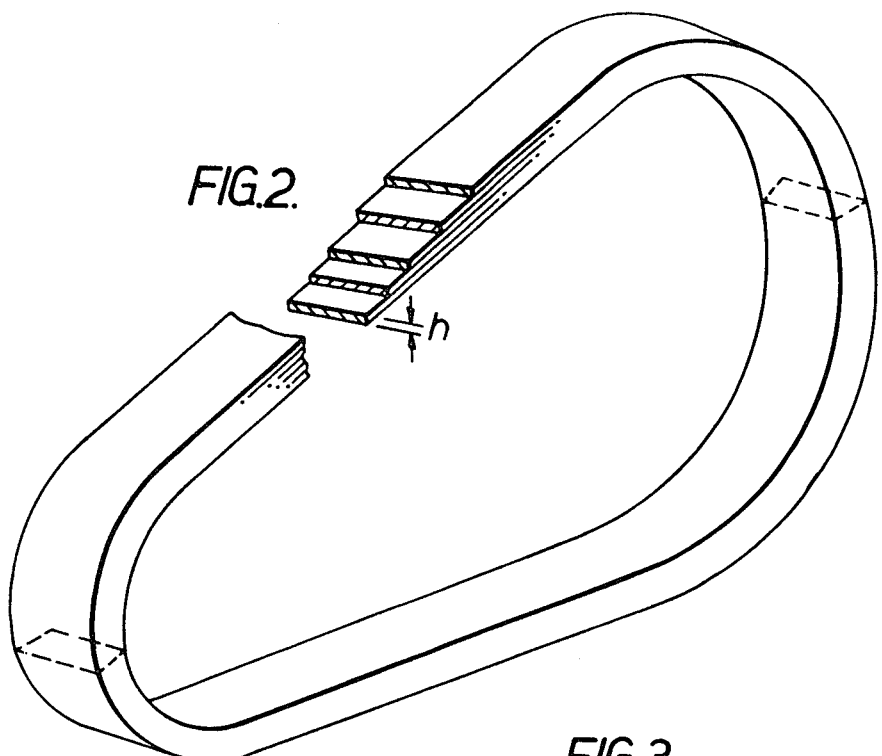
FIG. 2 illustrates the thickness of a set of steel belts which should be as small as possible to limit the so-called creeping effect.

On the other hand the thickness of the set of steel belts as indicated in FIG. 2 must be as small as possible in order to limit the so-called creeping effect, i.e. the movement of the belts with regard to each other and thereby to keep the efficiency of the transmission as favorable as possible.

Said creeping effect is caused by the fact that the transmission ratio of the various belts is not equal. The creeping effect becomes greater if the differences of the running radius of the latter is greater. In order to satisfy both requirements in the driving mechanism comprising pulleys having variable diameters according to the invention the steel belts are arranged about each other with a play $j$ that is greater than 0.3 × the thickness $h$ of the belt and smaller than 1.8 × the thickness $h$ of the belt.

Figure 3:
FIG. 3 shows a cross section of a set of steel belts arranged about each other.

An example of a set of steel belts arranged about each other is shown in FIG. 3 in an exaggerated section.

In this way optimal operation conditions of the driving mechanism according to the invention are obtained.

Furthermore, it has to be considered that when a steel belt runs between pulleys having a V-shaped circumferential groove, the cross sections of the belts are changed by its bending between said pulleys. Namely, the angle of the flanks diminishes. Since said change of angle is dependent from the bending radius, the value of the change of angle is also dependent from the running radius, i.e. the level on which the belt is running.

In a belt made of rubber or canvas said differences of angle are taken up by the deformation of the material. In a steel belt, however, this is not the case. However, it is necessary that the belt bears as much as possible over the full height of the flanks on the surface of the pulleys in order to reduce the possibilities of slip.

When applied in a driving mechanism having variable pulley diameters in the driving mechanism according to the invention in order to satisfy said necessity when the belt is unbent in lateral direction, the angle of each of said chamfered flanks enclosed by the surface of said flank and the plane that is perpendicular to the axis of revolution of the pulley, is 1.1 to 1.4 × greater than the angle enclosed by the surface of the groove of the V-shaped pulley cooperating with said flanks and the plane perpendicular to the axis of revolution of said pulley.

It is also possible to round off the flanks of the steel belt, e.g. by grinding. In that case when applied in a driving mechanism having variable pulley diameters according to the invention and in order to satisfy the same necessity in a laterally unbent belt, the angle of the rounded off chamfered flanks enclosed by the chords of the flanks and the plane perpendicular to the axis of revolution of the pulley is 1.1 to 1.4 × greater than the angle enclosed by the surface of the groove of the V-shaped pulley cooperating with said flank and the plane perpendicular to the axis of revolution of said pulley.

In the drawing embodiments of the belt of the mechanism according to the invention are diagrammatically shown by way of example.

In FIG. 4 the angle $\alpha$ enclosed by the straight flank 1 of the unbent steel belt 2 and the plane perpendicular to the not illustrated axis of revolution of the pulley 3 is 1.1 to 1.4 × greater than the angle $\beta$ enclosed by the surface 4 of the V-shaped pulley 3 cooperating with the flank 1 and the plane $f$ perpendicular to the not illustrated axis of revolution of the pulley 3.

In FIG. 6 the angle enclosed by the chords 5 of the flank 6 and the plane $f$ perpendicular to the not illustrated axis of revolution of the pulley 3 is 1.1 to 1.4 × greater than the angle enclosed by the surface 4 of the V-shaped pulley 3 cooperating with said flank 6 and the plane $f$ perpendicular to the not illustrated axis of revolution of the pulley 3.

I claim:

1. Driving mechanism particularly for motor vehicles comprising a driving pulley having a V-shaped circumferential groove, a driven pulley having a V-shaped circumferential groove, a flexible endless member having chamfered flanks interconnecting and spanning said pulleys so that the diameter of said pulleys can be varied automatically and steplessly with regard to each other so that different transmission ratios can be obtained and said flexible endless member comprising a plurality of layers of steel belts.

2. A driving mechanism according to claim 1 wherein said belts are arranged about each other.

3. A driving mechanism according to claim 2 wherein said steel belts are arranged with a mutual play that is greater than $0.3 \times$ the thickness of the belt and smaller than $1.8 \times$ the thickness of the belt.

4. A driving mechanism according to claim 1 wherein in each laterally unbent belt the angle of each of the straight flanks enclosed by the face of said flank and the plane perpendicular to the axis of revolution of the pulley, is 1.1 to 1.4 greater than the angle enclosed by the surface of the V-shaped pulley cooperating with said flank and the plane perpendicular to the axis of revolution of said pulley.

5. A driving mechanism according to claim 4 wherein in each laterally unbent belt of each of said rounded-off flanks the angle enclosed by the chords of the flanks and the plane perpendicular to the axis of revolution of the pulley, is 1.1 to $1.4 \times$ greater than the angle enclosed by the surface of said V-shaped pulley cooperating with said flank and the plane perpendicular to the axis of revolution of said pulley.